(12) United States Patent
Kuo (10) Patent No.: US 6,266,991 B1
(45) Date of Patent: Jul. 31, 2001

(54) COLDWORK HOLES WITH REUSABLE SEAMLESS SMA SLEEVE

(76) Inventor: Albert S. Kuo, 14244 Kinderhook Dr., Chesterfield, MO (US) 63017

( * ) Notice: Subject to any disclaimer, the term of this patent is extended or adjusted under 35 U.S.C. 154(b) by 0 days.

(21) Appl. No.: 09/541,806

(22) Filed: Apr. 3, 2000

(51) Int. Cl.[7] .................................................. B21D 31/00
(52) U.S. Cl. ......................................................... 72/370.07
(58) Field of Search .............................. 72/370.07, 391.2

(56) References Cited

U.S. PATENT DOCUMENTS

| | | |
|---|---|---|
| 3,566,662 | 3/1971 | Champoux . |
| 3,895,922 | 7/1975 | Phillips . |
| 3,943,748 | 3/1976 | King, Jr. . |
| 3,951,561 | 4/1976 | Speakman . |
| 4,164,807 | 8/1979 | King, Jr. . |
| 4,423,619 | 1/1984 | Champoux . |
| 4,433,567 | 2/1984 | Mead . |
| 4,665,732 | 5/1987 | Hogenhout . |
| 4,956,991 * | 9/1990 | Noonan ............................. 72/370.07 |
| 5,127,254 | 7/1992 | Copple . |
| 5,943,898 | 8/1999 | Kuo . |

* cited by examiner

Primary Examiner—Lowell A. Larson (57) ABSTRACT

A method and apparatus for coldworking holes using a reusable tubular seamless sleeve made of shape memory alloys. The apparatus uses a pre-lubricated tubular seamless sleeve made of shape memory alloys having a superelasticity property, a mandrel having a major diameter portion, an end-cap with a rough surface, and an adapting-spacer having a rough complementary surface. The preferred coldworking operation includes the steps of placing the sleeve firmly between the rough surfaces of the end-cap and the adapting-spacer which are carried on a mandrel pulling means, passing forward the major diameter portion of the mandrel through the sleeve whose diameter is therefore elastically expanded and thereafter shrinks to a size sufficiently smaller than the diameter of a hole in a workpiece, inserting the sleeve together with the mandrel into said hole, placing the end-cap against the workpiece, retracting the mandrel backward through and out of the sleeve; thereby elastically expanding the sleeve wall against the hole bore and exerting radial outward forces on the sleeve which in turn transmitting the coldworking force to the hole bore; thereafter the sleeve diameter shrinking to a size sufficiently smaller than the diameter of the coldworked hole to ease the removal the sleeve out of the hole. The sleeve is reusable due to the repeatability of the superelasticity property of shape memory alloys.

22 Claims, 4 Drawing Sheets

COLDWORK HOLES WITH REUSABLE SEAMLESS SMA SLEEVE

BACKGROUND OF THE INVENTION

The fatigue lives of metal structures and machinery can be enhanced by a hole coldworking method which creates a beneficial compressive residual stress at hole edge. Such a method is especially usefull in the manufacturing of airframe structures. Several prior art methods are available to enhance fatigue lives of holes, for example, split sleeve method described in U.S. Pat. No. 3,566,662, seamless sleeve method described in U.S. Pat. No. 4,164,807, stress coining method described in U.S. Pat. No. 3,895,922, split mandrel method described in U.S. Pat. No. 4,665,732, shape memory effect sleeve method described in U.S. Pat. No. 4,433,567, and my recent invention described in U.S. Pat. No. 5,943,898 which utilizes a tubular seamless sleeve made of shape memory alloy having a superelasticity property. The disadvantages of the prior art of hole coldworking methods including split sleeve, split mandrel, stress coining, and seamless sleeve were discussed in my previous invention of U.S. Pat. No. 5,943,898. The split sleeve method is the common method currently used in the aerospace industry. The disadvantages of the prior art of split sleeve and split mandrel methods are associated with the creation of a ridge and shear discontinuity in the bore of a coldworked hole. The prior art of shape memory effect sleeve method requires to cool down a sleeve to cryogenic temperatures; therefore the method is impractical for the application to productions. All of the aforementioned disadvantages of the prior art of coldworking methods were eliminated by my previous invention of U.S. Pat. No. 5,943,898, which utilizes a tubular seamless sleeve made of shape memory alloys having a superelasticity property. However, shape memory alloys are much more expensive comparing with the other metals for airframe structures. Furthermore, hole coldworking is usually performed manually; there is a trend in the aerospace industry for the automation of hole coldworking to reduce labor cost and maintain consistent quality.

SUMMARY OF THE INVENTION

The present invention described herein is an improvement of my previous invention of U.S. Pat. No. 5,943,898. The improvement makes the expensive seamless sleeve made of shape memory alloys become reuseable for saving material cost, and become amiable to manufacturing automation for reducing labor cost and maintaining consistent quality.

A tubular seamless reusable sleeve coldworking method and apparatus utilizing shape memory alloys (abbreviated hereinafter as SMA in this document) having a superelasticity property is invented and described hereinafter to enhance the fatigue lives of holes. The tubular seamless SMA sleeve coldworking method eliminates the final reaming step of the prior art of split sleeve and split mandrel coldworking methods described in U.S. Pat. Nos. 3,566,662 and 4,665,732. In contrast to the prior art of seamless sleeve coldworking method described in U.S. Pat. No. 4,164,807, the diameter of the seamless SMA sleeve shrinks, owing to the superelasticity property of SMA, after hole expansion, to a size smaller than the diameter of the coldworked hole to ease the removal of the seamless SMA sleeve. Hence the present invention not only shortens manufacturing time to reduce labor cost, creates higher beneficial compressive residual stress at hole edge than the split sleeve and split mandrel method, but also reduces material cost via the reusable sleeve.

In general, the method of coldworking holes of this invention comprises the steps of assembling a pre-lubricated tubular seamless sleeve made of SMA having a superelasticity property and the associated parts to the coldworking mandrel pulling means, securing firmly said sleeve in the mandrel pulling means, pushing the mandrel forward through the sleeve, inserting the mandrel and sleeve into a hole to be coldworked in an associated workpiece, holding the sleeve in the hole while retracting the mandrel backward from the workpiece, thereby expanding the sleeve to contact with hole wall and thereby compressing the materials of the sleeve and the hole in a radial direction taken from the center axis of the hole, and removing the sleeve, whose diameter shrinks to a size sufficiently smaller than the coldworked hole, out of the coldworked hole. The apparatus uses a pre-lubricated tubular seamless sleeve made of SMA having a superelasticity property, a mandrel having a major and a minor diameter portions, an end-cap with rough surface, an adapting-spacer with rough surface complementary to the end-cap, and an extension tube. Said sleeve is reusable. Said adapting-spacer is an assembly consisting of a spacer with rough surface, a bearing, and an screw-threaded adapter.

It is therefore an object of the present invention to provide a hole coldworking method which eliminates the need for the final reaming of holes, thereby shortens manufacturing time and reduces labor cost, and thereby better improves fatigue life of holes than the prior art methods of coldworking.

It is a further object of the present invention to make the costly seamless SMA sleeve become reuseable to save material cost, and become amiable to manufacture automation for reducing labor cost and maintaining consistent quality.

DESCRIPTION OF THE FIGURES

Further objects and advantages of the present invention will become apparent from the following description taken in conjunction with the accompanying drawings, which are illustrated in cross sectional and isometric views for explanatory purpose.

DETAILED DESCRIPTION OF THE INVENTION

When considering the most essential steps of this invention to improve the prior art of coldworking methods, especially my previous invention of U.S. Pat. No. 5,943,898, references should be made to FIGS. 1 through 11.

The present invention of hole coldworking utilizes a tubular seamless sleeve made of shape memory alloys which has a superelasticity property. The superelasticity property of SMA is described in C. M. Wayman's article entitled "Shape Memory Alloys" which was published in Materials Research Society Bulletin, Volume 18, Number 4, April 1993. SMA have two effects namely shape memory effect and superelasticity effect. The prior art of U.S. Pat. No. 4,433,567 utilized the shape memory effect, which requires a substantial change of the temperature of a sleeve during the hole coldworking operation. The present invention and my previous invention of U.S. Pat. No. 5,943,898 utilize the superelasticity effect, which is effective at ambient temperatures of manufacturing shops during the coldworking operation and does not require a substantial change of the temperature of a sleeve. To demonstrate how the SMA can be made to become reuseable and amiable to manufacturing automation, the underlying concept of the present invention is explained with the following example to coldwork a nominal 0.2500 inch diameter hole using a tubular seamless SMA sleeve. All dimensions below are in the unit of inch. This example uses a typical coldworking interference level of 0.011 inch in diameter, which is 4.4% of the hole diameter.

Pre-coldwork hole diameter: 0.2430

Selected coldworking interference level: 0.0110

Expanded hole diameter with sleeve and mandrel in the hole: 0.2430+0.01110=0.2540

Selected wall thickness of sleeve: 0.0100

Mandrel major diameter: 0.2540−(2×0.010)=0.2340

Selected sleeve outside diameter which must be smaller than pre-coldwork hole diameter: 0.2400 (<0.2430)

Sleeve inside diameter: 0.2400−(2×0.010)=0.2200

While the seamless sleeve and mandrel are in the hole during the coldworking operation, the sleeve inside diameter, 0.2200, is expanded by the mandrel to the same size as the mandrel diameter, 0.2340. The approximate hoop strain of the sleeve is calculated below:

$$\frac{0.2340-0.2200}{0.2200}=\frac{0.0140}{0.2200}=6.4\%$$

This 6.4% of hoop strain is substantially larger than the yield strain of most materials except the SMA. To ease the removal of the seamless sleeve out of a hole after coldworking, the strain of 6.4% must be smaller than the critical recoverable strain of a SMA so that the sleeve outside diameter can restore, via the superelasticity property of a SMA, to a size which is smaller than the plastically expanded hole diameter after coldworking. The critical recoverable strain is a characteristic and is specific to each SMA. For the nickel-titanium (Nitinol) and copper-zinc (Cu—Zn) families of SMA, this critical strain is approximately 7% to 10%. Except for the SMA, the recoverable elastic strains of most metallic materials are smaller than 1.0% which is well below the current practice of coldworking interference level of about 4%. This is the reason why the sleeve in the prior art of seamless sleeve method described in U.S. Pat. No. 4,164,807 is difficult to remove from the expanded holes after coldworking. The present invention and my previous invention of U.S. Pat. No. 5,943,898 utilize the tubular seamless SMA sleeve to overcome this difficulty. The superelasticity property of SMA is repeatable. The present invention utilizes such a repeatable property to make the seamless SMA sleeve reuseable and amiable to manufacturing automation. However, the critical recoverable strain can become smaller when the superelasticity property is repeated for a certain number of times. In particular, when a tubular seamless SMA sleeve operates at coldworking interference levels sufficiently higher than the typical 4%, said sleeve may not shrink to its original diameter due to the repeated application of the same piece of said sleeve. But, as long as said sleeve can shrink to a size sufficiently smaller than the diameter of a coldworked hole, said sleeve still can be easily removed out of the coldworked hole; and as long as said sleeve can shrink to a size sufficiently smaller than the diameter of a pre-coldwork hole, said sleeve can be easily inserted into said pre-coldwork hole. Therefore, said sleeve is reusable. In the specification of my previous invention of U.S. Pat. No. 5,943,898, it was stated that the seamless SMA sleeve restores to its "original" size after coldworking. It is clear from the above discussion that this is not a necessary condition in the present invention.

One embodiment of the present invention is described hereinafter to illustrate the essential characteristics of the present invention.

Figure 1:
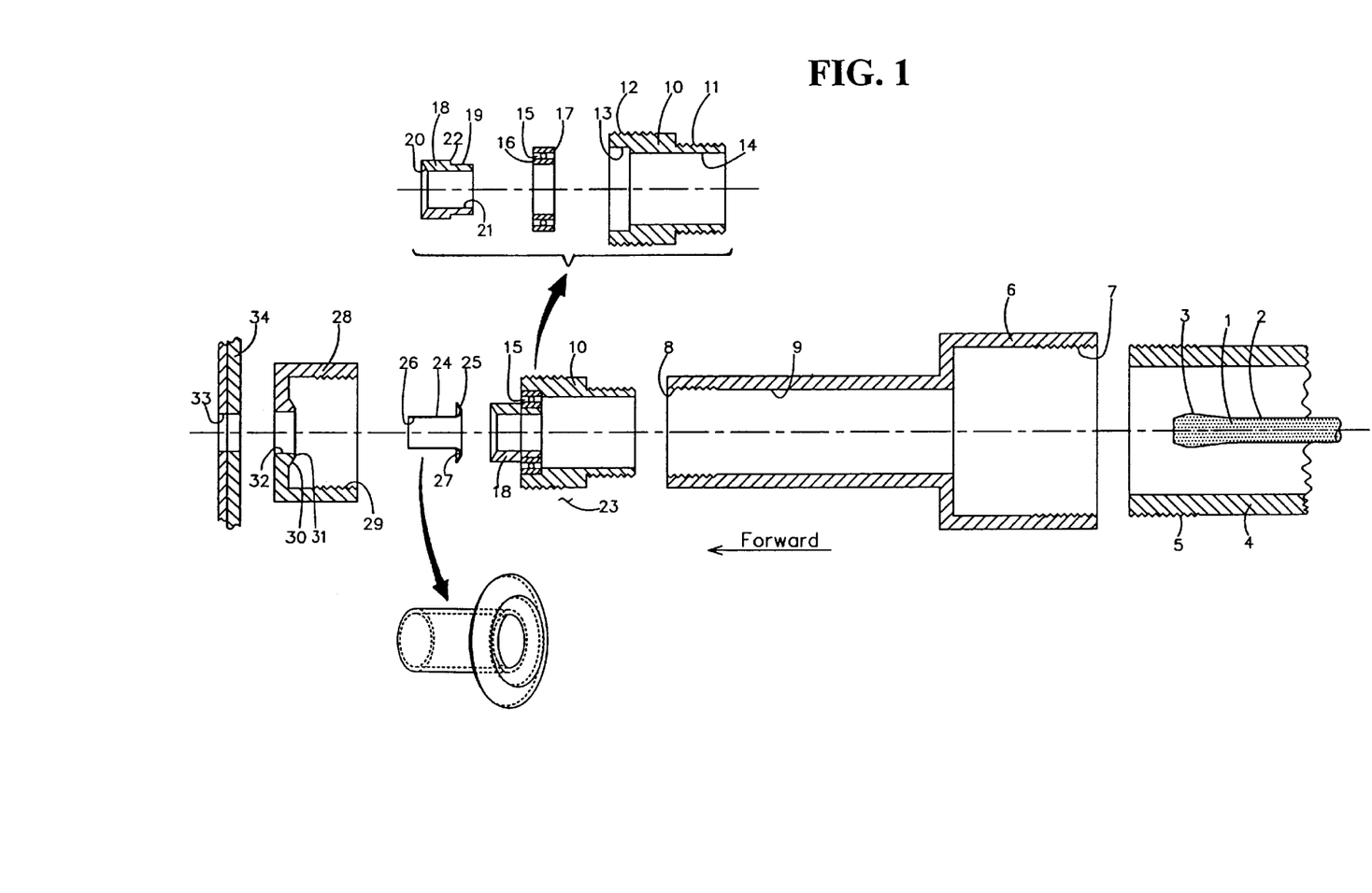
FIG. 1 is a cross sectional view of the parts of the present invention, the forward end of the cylinder of a mandrel pulling means in which the invention is carried, and the workpiece. Also shown in FIG. 1 is an isometric view of the shape memory alloys seamless sleeve.

In FIG. 1, a portion of the cylinder of a mandrel pulling means 4 having a mandrel 1 is coaxially lined up with a workpiece 34 having a hole 33. Placed between the workpiece 34 and the cylinder of a mandrel pulling means 4 are an extension-tube 6, an adapting-spacer 23, a pre-lubricated tubular seamless SMA sleeve 24, and an end-cap 28. The cylinder of a mandrel pulling means 4 has a screw-threaded front end 5. The mandrel 1 has a major diameter portion 3 and a minor diameter portion 2. The extension-tube 6 has a screw-threaded front end 8, a screw-threaded rear end 7, and a central circular passageway 9. The adapting-spacer 23 is an assembly consisting of an adapter 10, a bearing 15, and a spacer 18. The adapter 10 has a screw-threaded front end 12, a screw-threaded rear end 11, a counter-bore 13 at the front end to sufficiently firmly seat the bearing 15, and a central circular passageway 14. The outer ring 17 of the bearing 15 is sufficiently tightly seated on the counter-bore 13 of the adapter 10. The spacer 18 is made of a hard material, has a small diameter 19 in the rear portion, has a conical rough surface 20 in the large diameter front portion, and has a central circular passageway 21. The small diameter 19 in the rear portion of the spacer 18 is sufficiently tightly fitted into the inner ring 16 of the bearing 15 to prevent the relative rotational motion between the spacer 18 and the inner ring 16 of the bearing 15. The junction of the large diameter portion 20 and the small diameter portion 19 of the spacer 18 forms a step 22, which seats on the front face of the inner ring 16 of the bearing 15 to prevent the axial motion between the spacer 18 and the bearing 15. The tubular seamless SMA sleeve 24 is made of shape memory alloys having a superelasticity property, does not have a seam or slot in the sleeve wall, and comprises a conical shoulder portion 25, a tubular portion 26, and a fillet radius 27 joining the conical shoulder portion 25 and tubular portion 26. The required recoverable elastic strain for a SMA is determined by the desired coldworking interference level as explained hereinbefore. Any kind of SMA that has a critical recoverable elastic strain in excess of the required value can be used to make the seamless sleeve of the present invention. The Nitinol and Cu—Zn families of SMA possess such a superelastic property. Currently, the Nitinol family of SMA is a preferred material because they have a sufficient critical recoverable strain and are technologically well-developed. When technology advances in the future, new family of SMA may be available for making the seamless sleeve of this invention. The end-cap 28 is made of a hard material, has a screw-threaded rear end 29, a conical rough surface 30 for said sleeve to rest on, a central circular passageway 32, and a fillet radius 31 joining said central circular passageway 32 and conical rough surface 30.

The aforementioned coldworking apparatus of present invention has several improvements when comparing with my previous invention of U.S. Pat. No. 5,943, 898. The extension-tube 6 provides a means for getting access to the holes to be coldworked. When coldworking the holes of the same diameter, the adapting-spacer 23 stays firmly together with said extension-tube 6; it need not be removed from said extension-tube 6 for changing the seamless SMA sleeve 24. The spacer 18 is sufficiently firmly assembled into the adapting-spacer 23; hence it will not drop out of an operator's hands while he is changing a sleeve. This is an improvement over the aforesaid previous invention of mine, wherein the spacer is a small separate piece and is prone to being dropped out of an operator's hands while he is changing a sleeve. Another improvement is the use of a bearing 15 to ease the circular motion of spacer 18, while fastening the end-cap 28 to the adapting-spacer 23 by turning the screw-threaded end 29 of end-cap 28, in lieu of the use of smooth contact surfaces in the aforesaid previous invention of mine.

Figure 2:
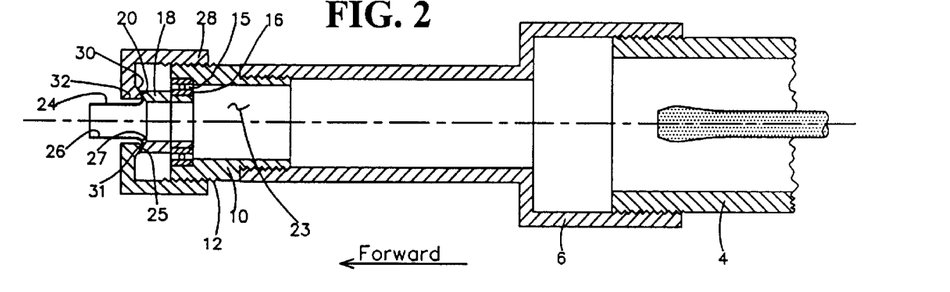
FIG. 2 is a cross sectional view of the parts of the present invention, which are assembled together with a mandrel pulling means.

A preferred coldworking operation comprises of the following six steps. The first step of coldworking operation, illustrated in FIG. 2, is to assemble coaxially the cylinder of a mandrel pulling means 4, extension-tube 6, adapting-spacer 23, pre-lubricated tubular seamless SMA sleeve 24, and end-cap 28. The conical contact surface 20 in the spacer 18 contained in the adapting-spacer 23, the conical surface 30 in the end-cap 28, and the conical shoulder 25 in said sleeve 24 are complementary to each other to ensure the coaxiality of the affected parts being automatically sufficiently maintained during the step of assembling. The fillet radius 27 in said sleeve 24 and the fillet radius 31 in the end-cap 28 are complementary to each other to maintain substantially equal space between the central circular passageway 32 of the end-cap 28 and the tubular portion 26 of said sleeve 24.

The second step of coldworking operation, also illustrated in FIG. 2, is to secure firmly the conical shoulder 25 of the seamless SMA sleeve 24 between the spacer 18 and end-cap 28 with a force by tightening the screw-threaded end-cap 28 onto the screw-threaded front end 12 the adapter 10. The step of tightening is facilitated by the bearing 15 because the spacer 18 is firmly secured to the inner ring 16 of the bearing 15. The conical rough contact surfaces of the spacer 18 and end-cap 28 increase the friction, thereby enhancing the firm position of said sleeve 24 during the step of tightening.

Figure 3:
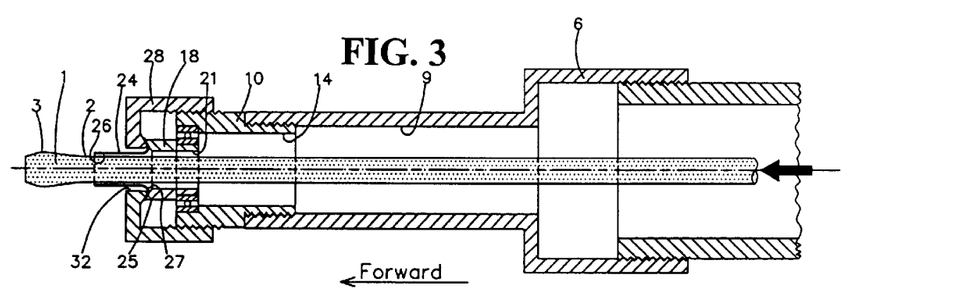
FIG. 3 is a cross sectional view to show that the diameter of a tubular seamless SMA sleeve shrinks to a size sufficiently smaller than the diameter of a hole to be coldworked after the major diameter portion of a mandrel passing forward through and out of said sleeve.

The third step of coldworking operation, illustrated in FIG. 3, is to push the major diameter portion 3 of the mandrel 1 through the central circular passageway 9 of the extension-tube 6, circular central passageway 14 of the adapter 10, central circular passageway 21 of the spacer 18, and the tubular portion 26 of the seamless SMA sleeve 24, and to position the mandrel 1 at a location such that the minor diameter portion 2 of the mandrel 1 is adequately inside of said sleeve 24. The fillet radius 27 joining the tubular portion 26 and the shoulder portion 25 of said sleeve 24 provides a larger diameter than the inside diameter of the tubular portion 26 of said sleeve 24 to ease the entrance of the major diameter portion 3 of the mandrel 1. Because the major mandrel diameter 3 is substantially larger than the inside diameter of said sleeve 24, a substantial axial force is applied to said sleeve 24 while the major diameter portion 3 of the mandrel 1 passes through said sleeve 24. The lubricant provided on the inside surface of the tubular portion 26 of said sleeve 24 decreases the friction between said mandrel 1 and sleeve 24, thereby reducing the required axial force. However, to prevent the slippage of said sleeve 24, the conical shoulder 25 of said sleeve 24 is held firmly between the conical contact surfaces of the spacer 18 and the end-cap 28. This is achieved by using the rough contact surfaces of the spacer 18 and the end-cap 28 to increase the friction, and by inclining the conical contact surfaces in a direction in favor of preventing slippage while the major diameter portion 3 of the mandrel 1 passes forward through said sleeve 24. The diameter of the central circular passageway 32 of the end-cap 28 is sufficiently large so that the outside surface of said sleeve 24 will not interfere with the end-cap 28 while the mandrel 1 passing forward through said sleeve 24. While the major diameter portion 3 of the mandrel 1 passes through said sleeve 24, it exerts a radial force on and thereby elastically expands the diameter of said sleeve 24. After the major diameter portion 3 of the mandrel 1 passes forward through and out of said sleeve 24, the diameter of said sleeve 24 shrinks to a size sufficiently smaller than the diameter of the hole to be coldworked, owing to the superelasticity property of the shape memory alloys.

Figure 4:
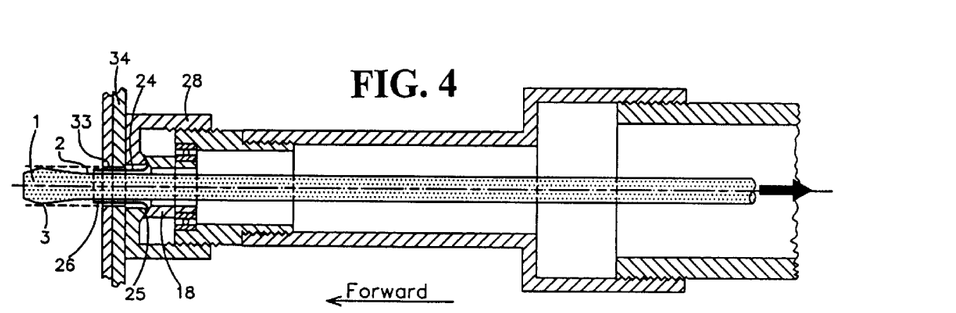
FIG. 4 is a cross sectional view that shows the insertion of a tubular seamless SMA sleeve and a mandrel into the hole of an associated workpiece, and the relative diameters of said hole, said sleeve, and said mandrel.

The fourth step of coldworking operation, illustrated in FIG. 4, is to insert the mandrel 1 and the seamless SMA sleeve 24 into the hole 33 of an associated workpiece 34. The position of the hole 33 in the associated workpiece 34 is coincident with the small diameter portion 2 of the mandrel 1 surrounded by said sleeve 24 whose conical shoulder 25 remains firmly held between the spacer 18 and the end-cap 28.

The fifth step of coldworking operation, also illustrated in FIG. 4, is to retract the mandrel 1 backward; in doing so, the major diameter portion 3 of the mandrel 1 exerts a radial force onto the tubular portion 26 of the seamless SMA sleeve 24 because the diameter of the major diameter, portion 3 of the mandrel 1 is substantially larger than the diameter of the tubular portion 26 of said seamless SMA sleeve 24. The movement of the tubular portion 26 of said sleeve 24 in the axial or circulatory direction is insignificant because the shoulder portion 25 of said sleeve 24 is held firmly between the spacer 18 and the end-cap 28, and because the lubricant on the inside surface of the tubular portion 26 of said sleeve 24 decreases the friction between the mandrel 1 and said sleeve 24, and because of the high friction of the contact surfaces between the hole 33 and tubular portion 26 of said sleeve 24. The diameter of the tubular portion 26 of said sleeve 24 elastically expands beyond the diameter of the hole 33 in the associated workpiece 34; therefore the material of the hole 33 is compressed by the tubular portion 26 of said sleeve 24 and the hole diameter expands beyond its yield strength. Thus, a compressive residual stress is created around the hole 33 to improve fatigue life.

Figure 5:
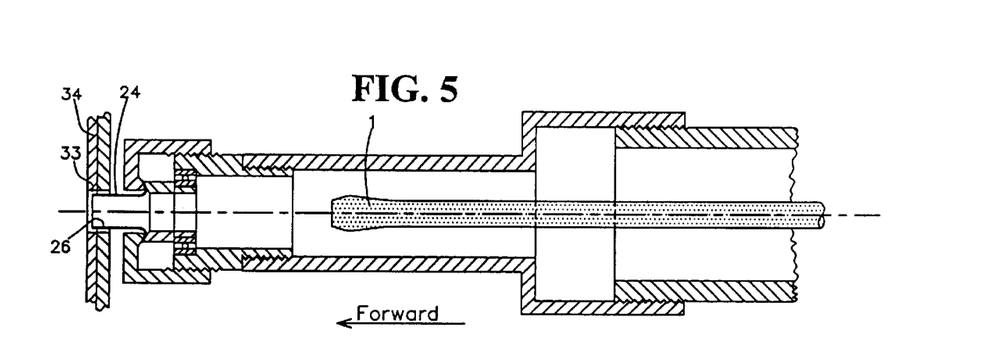
FIG. 5 is a cross sectional view which shows the position of the mandrel after retracting backward, the diameter of the hole in an associated workpiece being enlarged, the diameter of the seamless SMA sleeve shrinking to a size sufficiently smaller than the diameter of the coldworked hole

The sixth and final step of coldworking operation, illustrated in FIG. 5, is to remove the seamless SMA sleeve 24 together with the mandrel 1 and the mandrel pulling means out of the coldworked hole 33 of the associated workpiece 34. After the major diameter portion 3 of the mandrel 1 retracts backward through and out of the tubular portion 26 of said sleeve 24, the diameter of said sleeve 24 shrinks, because of the superelasticity property of SMA, to a size sufficiently smaller than the diameter of the coldworked hole 33 to ease the removal of said sleeve 24.

To coldwork a next hole of the same size, repeat the aforesaid steps 3 through 6 inclusive. The same seamless SMA sleeve is reuseable owing to the repeatability of the superelasticity property of SMA. There is no need to de-assemble the apparatus and change the sleeve. Such 2 feature makes the present invention amiable to manufacturing automation. The assembly of the apparatus shown in FIG. 2 can be installed in an automatic hole drilling system which drills a pilot hole, reams the pilot hole to a pre-coldwork hole size, and coldworks the hole. No reaming is required after coldworking.

Figure 6:
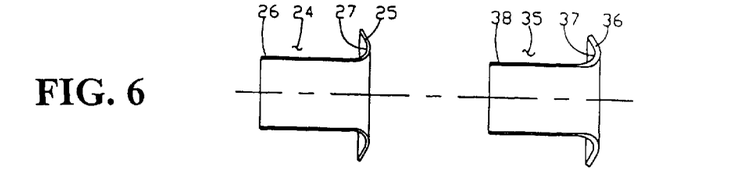
FIG. 6 is a cross sectional view which shows an alternate design of the tubular seamless SMA sleeve having an inclined shoulder portion.

An alternate design, illustrated in FIG. 6, for the tubular seamless SMA sleeve 35 is to increase the thickness' of the conical shoulder portion 36, the fillet radius 37 and its junction to the tubular portion 38. The seamless SMA sleeve 24 specified in FIG. 1 is also shown in FIG. 6 for a comparison with the alternate design. The increased thickness strengthens said sleeve 35; thereby reduces the propensity of the damage due to the repeated use of said sleeve 35 during passing a mandrel, forward or backward, through and out of said sleeve; therefore prolongs the useful life of said sleeve 35. Prolonged life of a sleeve needs less frequent change of tools and is amiable to manufacturing automation.

Figure 7:
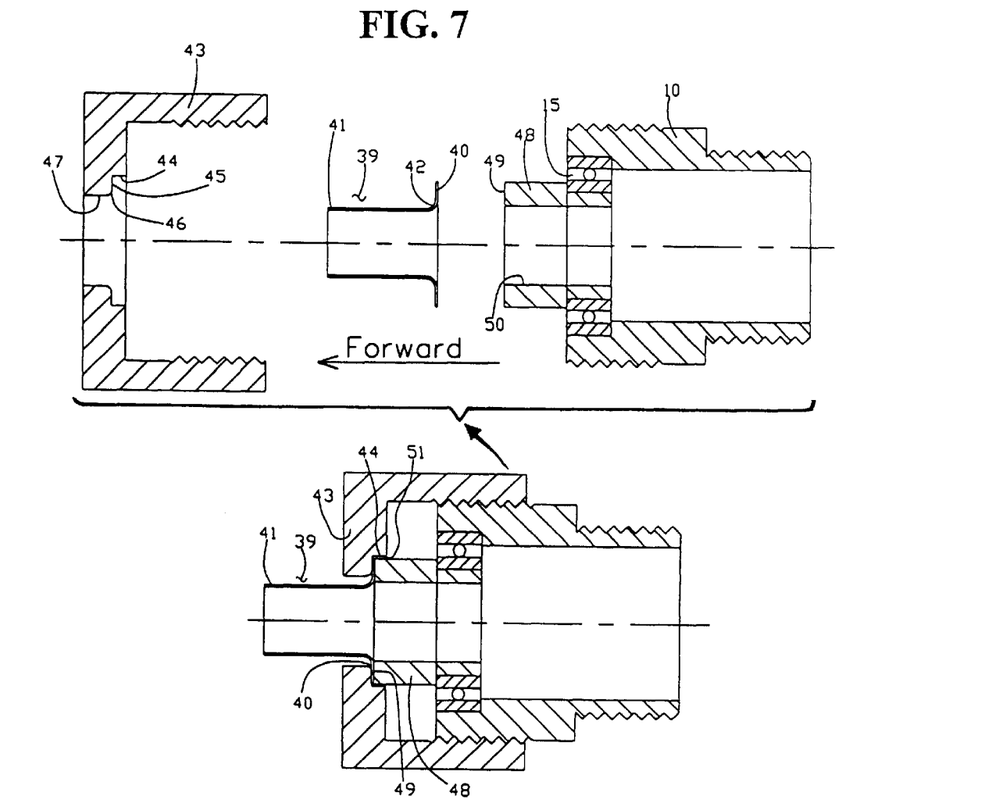
FIG. 7 is a cross sectional view which shows an alternate design for the shoulder portion of the tubular seamless sleeve, and the associated alternate designs for the end-cap and spacer.

Yet another alternate designs, illustrated in FIG. 7, is the tubular seamless SMA sleeve 39 and the associated end-cap 43 and spacer 48. In this alternate design of said sleeve 39, the shoulder portion 40 does not incline to the forward direction of the coldworking operation, but is perpendicular to the tubular portion 41; the shoulder portion 40 is joined with the tubular portion 41 by a fillet radius 42. The alternate design of the end-cap 43 does not have a conical rough surface but has a rough surface 45 perpendicular to the central circular passageway 47, has a fillet radius 46 to complement the fillet radius 42 of said sleeve 39, and has a counter-bore 44 to seat said sleeve 39 and spacer 48. The alternate design of the spacer 48 does not have a rough conical surface but has a rough surface 49 perpendicular to the central circular passageway 50. The alternate design of said sleeve 39 is easier to fabricate than those designs shown in FIG. 6 However, in order to maintain sufficiently equal space between the tubular portion 41 of said sleeve 39 and the central circular passageway 47 of the end-cap 43 after tightening the screw-threaded end-cap 43 onto the screw-threaded adapter 10, it requires a tight clearance 51 between the counter-bore 44 of the end-cap 43 and the perimeter of the shoulder portion 40 of said sleeve 39.

Figure 8:
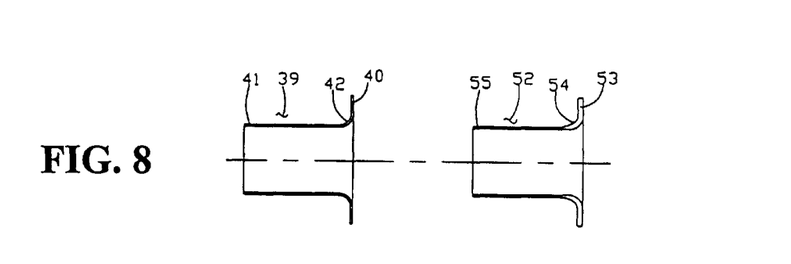
FIG. 8 is a cross sectional view which shows an alternate design for the tubular seamless sleeve having a shoulder portion perpendicular to the tubular portion.

An alternate design, illustrated in FIG. 8, for the tubular seamless SMA sleeve 52 is to increase the thickness' of the shoulder portion 53, the fillet radius 54 and its junction to the tubular portion 55. The seamless SMA sleeve 39 specified in FIG. 7 is also shown in FIG. 8 for a comparison with the alternate design. The increased thickness strengthens said sleeve 52; thereby reduces the propensity of the damage due to the repeated use of said sleeve 52 during passing a mandrel, forward or backward, through and out of said sleeve 52; therefore prolongs the useful life of said sleeve 52. Prolonged life of a sleeve needs less frequent change of tools and is amiable to manufacturing automation.

Figure 9:
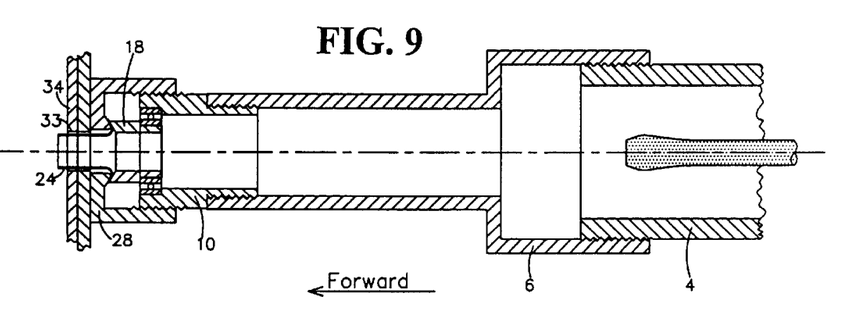
FIG. 9 is a cross sectional view which shows the seamless SMA sleeve being inserted into a hole to be coldworked while the mandrel is not surrounded by said sleeve, and the end-cap being placed against a workpiece.
Figure 10:
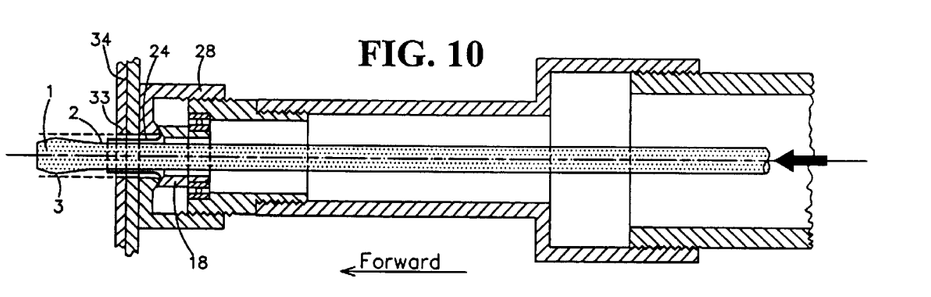
FIG. 10 is a cross sectional view which shows the mandrel being pushed through and out the seamless SMA sleeve; thereby expands said sleeve to coldwork the hole.
Figure 11:
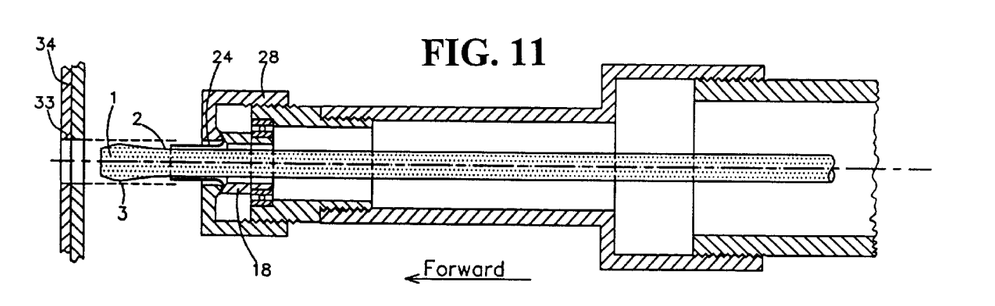
FIG. 11 is a cross sectional view which shows the seamless SMA sleeve together with mandrel being removed out of the coldworked hole.

The first alternate coldworking operation comprises of the following six steps. Some of the steps are the same as those specified for the aforesaid preferred coldworking operation. The first step of the first alternate coldworking operation, illustrated in FIG. 2, is to assemble the parts of the coldworking apparatus to be ready for the operation; this step is the same as the first step of the aforesaid preferred coldworking operation. The second step of the first alternate coldworking operation, also illustrated in FIG. 2, is to secure firmly the seamless SMA sleeve in the coldworking apparatus; this step is the same as the second step of the aforesaid preferred coldworking operation. The third step of the first alternate coldworking operation, illustrated in FIG. 9, is to insert said sleeve 24 into a hole 33 in a workpiece 34 and place the end-cap 28 against said workpiece. The fourth step of the first alternate coldworking operation, illustrated in FIG. 10, is to push forward the mandrel 1 through and out of said sleeve 24; in doing so, said mandrel 1 exerts a radial force onto said sleeve 24 which elastically expands beyond the diameter of said hole 33; therefore, the material of said hole 33 is compressed by said sleeve 24 and said hole 33 expands beyond its yield strength; thereafter a compressive residual stress is created around said hole 33 to improve fatigue life. The fifth step of the first alternate coldworking operation, illustrated in FIG. 11, is to remove said sleeve 24 together with the mandrel 1 and the mandrel pulling means out of the coldworked said hole 33. The diameter of said sleeve 24 shrinks, because of the superelasticity property of SMA, to a size sufficiently small than the diameter of the coldworked said hole 33 to ease the removal of said sleeve 24. The major diameter portion 3 of the mandrel 1 is smaller than the diameter of coldworked said hole 33. The sixth and final step of the first alternate coldworking operation is to retract the mandrel 1 through and out of said sleeve 24 to the starting position shown in FIG. 2. To coldwork the next hole, repeat the steps 3 though 6 inclusive. There exist a major difference between the first alternate coldworking operation and the aforesaid preferred coldworking operation. In the first alternate coldworking operation, the forward motion of the mandrel 1 is used to create the compressive residual stress which improves fatigue life whereas in the aforesaid preferred coldworking operation, the backward motion of the mandrel 1 is used to create the compressive residual stress.

The second alternate coldworking operation comprises of the following eight steps. Each of the eight steps is individually the same as one of those steps in the aforesaid preferred and alternate coldworking operations. However, the order of the operation is different. The first of the second alternate coldworking operation, illustrated in FIG. 2, is to assemble the parts the coldworking apparatus to be ready for the operation; this step is the same as the first step of the aforesaid preferred coldworking operation. The second step of the second alternate coldworking operation, also illustrated in FIG. 2, is to secure firmly the seamless SMA sleeve 24 in the coldworking apparatus; this step is the same as the second step of the aforesaid preferred coldworking operation. The third step of the second alternate coldworking operation, illustrated in FIG. 9, is to insert said sleeve into a hole 33 in a workpiece 34 and place the end-cap 28 against said workpiece. This step is the same as the third step of the first alternate coldworking operation. The fourth step of the second alternate coldworking operation, illustrated in FIG. 10, is to push forward the mandrel 1 through and out of said sleeve 24; in doing so, said mandrel exerts a radial force onto said sleeve 24 which elastically expands beyond the diameter of said hole 33; therefore, the material of said hole 33 is compressed by said sleeve 24 and said hole 33 expands beyond its yield strength; thereafter a compressive residual stress is created around said hole 33 to improve fatigue life. This step is the same as the fourth step of the first alternate coldworking operation. The fifth step of the second alternate coldworking operation, illustrated in FIG. 11, is to remove said sleeve 24 together with the mandrel 1 and the mandrel pulling means out of the coldworked said hole 33. This step is the same as the fifth step of the first alternate coldworking operation. The sixth step of the second alternate coldworking operation, illustrated in FIG. 4, is to insert the mandrel 1 and said sleeve 24 into the next hole to be coldworked. This step is the same as the fourth step of the aforesaid preferred coldworking operation. The seventh step of the second alternate coldworking operation, also illustrated in FIG. 4, is to retract the mandrel 1 backward; in doing so, said mandrel 1 exerts a radial force onto said sleeve 24 which elastically expands beyond the diameter of said hole 33; therefore, the material of said hole 33 is compressed by said sleeve 24 and said hole 33 expands beyond its yield strength; thereafter a compressive residual stress is created around said hole 33 to improve fatigue life. This step is the same as the fifth step of the aforesaid preferred coldworking operation. The eighth and final step of the second alternate coldworking operation, illustrated in FIG. 5, is to remove said sleeve 24 together with the mandrel 1 and the mandrel pulling means out of the coldworked hole. The diameter of said sleeve 24 shrinks, because of the repeatability of the superelasticity property of SMA, to a size sufficiently small than the diameter of the coldworked said hole 33 to ease the removal of said sleeve 24. This step is the same as the sixth step of the aforesaid preferred coldworking operation. To coldwork next holes, repeat steps 3 though 8 inclusive. The major difference between the second alternate coldworking operation and the aforesaid preferred and first alternate coldworking operations is that in the second alternate coldworking operation, both the forward and backward motions of the mandrel 1 are used to create the compressive residual stress which improves fatigue life.

The present invention and its attendant advantages will be understood from the foregoing description. It will be apparent that the form, construction, and arrangements of the tubular seamless sleeve made of shape memory alloys and the associated parts of the invention can be varied without changing the concept of the invention, that the specific embodiment of the invention described hereinbefore is considered in all respects as illustrative and not restrictive, and furthermore that variation may be made without departing from the scope of the invention as defined in the accompanying claims.

I claim:

1. A method to coldwork holes at ambient temperatures of manufacturing shops, utilizing superelasticity property of shape memory alloys, comprising the steps of:

(a) inserting a seamless sleeve made of a shape memory alloy having a superelasticity property into a hole in an associated workpiece, whose diameter is sufficiently larger than the outside diameter of said sleeve;

(b) placing a mandrel having a diameter at one end sufficiently larger than the inside diameter of said sleeve, the combined diameter of said mandrel and wall thickness of said sleeve being greater than the diameter of said hole;

(c) driving said end of said mandrel through and out of said sleeve to expand said sleeve and said hole, thereby coldworking the material around said hole; thereafter said sleeve at ambient temperature shrinking to an outside diameter sufficiently smaller than the diameter of coldworked said hole as to ease the removal of said sleeve out of coldworked said hole.

2. A method of coldworking holes as claimed in claim 1 wherein the seamless sleeve made of a shape memory alloy having a superelasticity property is reuseable.

3. A method of coldworking holes as claimed in claim 1, comprising the steps of:

(a) assembling coaxially a tubular seamless sleeve made of a shape memory alloy between screw-threaded end-cap of hard material, a spacer of hard material, a bearing, a screw-threaded adapter, and a screw-threaded extension-tube, which are carried on a mandre pulling means;

(b) securing sufficiently firmly said sleeve between said end-cap and said spacer with a by tightening said screw-threaded end-cap onto said adapter, which is assembled to said extension-tube, which is in turn assembled to the screw-threaded cylinder of said mandrel pulling means;

(c) pushing forward a mandrel, which has a major diameter portion at one end and a minor diameter portion at the other end, through the circular central passageways in the cylinder of said mandrel pulling means, said extension-tube, said adapter, said bearing, said spacer, and said sleeve to a location such that the minor diameter portion of said mandrel is adequately inside of said sleeve; while the major diameter portion of said mandrel being pushed through said sleeve, said sleeve being elastically expanded; thereafter, said sleeve shrinking to a size sufficiently smaller than said hole in said associated workpiece;

(d) inserting said mandrel and said sleeve into said hole of said workpiece;

(e) holding said mandrel and said sleeve in said hole while retracting backward said mandrel from said workpiece, thereby expanding the diameter of said sleeve into contact with the bore of said hole, and thereby compressing the materials of said sleeve and workpiece in a radial direction taken from the center axis of said hole; thereafter, the outside diameter of said sleeve shrinking to a size sufficiently smaller than the diameter of coldworked said hole as to ease the removal of said sleeve out of coldworked said hole; and (f) removing said sleeve and said mandrel together with its associated apparatus out of coldworked said hole.

4. A method of coldworking holes as claimed in claim 3 wherein the steps c, d, e and f are repeated to coldwork a next hole.

5. A method of coldworking holes as claimed in claim 1 comprising the steps of:

(a) assembling coaxially a tubular seamless sleeve made of a shape memory alloy between a screw-threaded end-cap of hard material, a spacer of hard material, a bearing, a screw-threaded adapter, and a screw-threaded extension-tube, which are carried on a mandrel pulling means;

(b) securing sufficiently firmly said sleeve between said end-cap and said spacer with a force by tightening said screw-threaded end-cap onto said adapter, which is assembled to said extension-tube, which is in turn assembled to the screw-threaded cylinder of said mandrel pulling means;

(c) inserting said sleeve into a hole in an associated workpiece and placing said end-cap against said workpiece;

(d) pushing forward a mandrel which has a major diameter portion at one end and a minor diameter portion at the other end, through the circular central passageways in the cylinder of said mandrel pulling means, said extension tube, said adapter, said bearing, said spacer, and said sleeve; while the major diameter portion of said mandrel being pushed through said sleeve, said sleeve being elastically expanded to contact with the bore of said hole, thereby compressing the material of said sleeve and workpiece in a radial direction taken from the center axis of said hole; thereafter, the outside diameter of said sleeve shrinking to a size sufficiently smaller than the diameter of coldworked said hole as to ease the removal of said sleeve out of coldworked hole;

(e) removing said sleeve together with said mandrel out of coldworked said hole; and (f) retracting backward said mandrel through and out of said sleeve.

6. A method of coldworking holes as claimed in claim 5 wherein the steps c, d, e and f are repeated to coldwork next hole.

7. A method of coldworking holes as claimed in claim 1 comprising the steps of:

(a) assembling coaxially a tubular seamless sleeve made of a shape memory alloy between a screw-threaded end-cap of hard material, a spacer of hard material, a bearing, a screw-threaded adapter, and a screw-threaded extension-tube, which are carried on a mandrel pulling means;

(b) securing sufficiently firmly said sleeve between said end-cap and said spacer with a force by tightening said screw-threaded end-cap onto said adapter, which is assembled to said extension-tube, which is in turn assembled to the screw-threaded cylinder of said mandrel pulling means;

(c) inserting said sleeve into a hole in an associated workpiece and placing said end-cap against said workpiece;

(d) pushing forward a mandrel which has a major diameter portion at one end and a minor diameter portion at the other end, through the circular central passageways in the cylinder of said mandrel pulling means, said extension-tube, said adapter, said bearing, said spacer, and said sleeve; while the major diameter portion of said mandrel being pushed through said sleeve, said sleeve being elastically expanded to contact with the bore of said hole, thereby compressing the material of said sleeve and workpiece in a radial direction taken from the center axis of said hole; thereafter, the outside diameter of said sleeve shrinking to a size sufficiently smaller than the diameter of coldworked said hole as to ease the removal of said sleeve out of coldworked hole;

(e) removing said sleeve together with said mandrel out of coldworked said hole;

(f) retracting backward said mandrel through and out of said sleeve;

(g) inserting said mandrel and said sleeve into a next hole to be coldworked;

(h) holding said mandrel and said sleeve in said hole while retracting backward said mandrel from said workpiece, thereby expanding the diameter of said sleeve to contact with the bore of said hole, and thereby compressing the materials of said sleeve and workpiece in a radial direction taken from the center axis of said hole; thereafter, the outside diameter of said sleeve shrinking to a size sufficiently smaller than the diameter of coldworked said hole as to ease the removal of said sleeve out of coldworked said hole; and (i) removing said sleeve and said mandrel together with its associated apparatus out of coldworked said hole.

8. A method of coldworking holes as claimed in claim 7 wherein the steps c through i inclusive are repeated to coldwork the next holes.

9. An apparatus for coldworking holes in an associated workpiece using tubular seamless sleeves made of a shape memory alloy with a superelasticity property in conjunction with its operation comprising in combination:

(a) a cylindrical-shaped mandrel having a major diameter portion and a minor diameter portion;

(b) a tubular seamless sleeve made of a shape memory alloy, having a tubular portion; a shoulder portion, and a fillet radius joining said tubular and said shoulder portions;

(c) said sleeve to be used as a means during coldworking operation for receiving exerted expansion forces from the major diameter portion of said mandrel while simultaneously adapted to carry said forces in a radial direction to the inside surface of a hole in an associated workpiece for enlarging said hole and putting the material around said hole in compression to improve fatigue property of said hole;

(d) an end-cap having a central circular passageway and a rough surface for complementing and seating the shoulder of said sleeve and for securing, in conjunction with a spacer, said sleeve;

(e) a spacer having a central circular passageway and a rough surface at one end for complementing the shoulder of said sleeve and for securing, in conjunction with said end-cap, said sleeve;

(f) a bearing to sufficiently firmly seat said spacer;

(g) an adapter to sufficiently firmly seat said bearing at one end, and to be assembled onto an extension-tube at the other end;

(h) an extension-tube to be assembled onto said adapter at one end, and to be assembled onto the cylinder of a mandrel pulling means at the other end.

10. The apparatus for coldworking holes as claimed in claim 9 wherein said sleeve is made of a shape memory alloy having a superelasticity property to shrink the diameter of said sleeve a size smaller than the diameter of a hole in an associated workpiece after the major diameter portion of said mandrel passing through and out of said sleeve.

11. The apparatus for coldworking holes as claimed in claim 9 wherein said sleeve is provided with a lubricant type of coating on the inside surface of said tubular portion.

12. The apparatus for coldworking holes as claimed in claim 9 wherein said sleeve is made of nickel-titanium (Nitinol) family of shape memory alloys having a superelasticity property.

13. The apparatus for coldworking holes as claimed in claim 9 wherein said sleeve is made of copper-zinc family of shape memory alloys having a superelasticity property.

14. The apparatus for coldworking holes as claimed in claim 9 wherein the thickness' of said shoulder portion, said fillet radius and its junction to said tubular portion are larger than the thickness of said tubular portion.

15. The apparatus for coldworking holes as claimed in claim 9 wherein said shoulder portion of said sleeve is perpendicular to said tubular portion.

16. The apparatus for coldworking holes as claimed in claim 9 wherein said shoulder portion of said sleeve inclines in a direction in favor of preventing slippage while said mandrel passing forward through and out of said sleeve.

17. The apparatus for coldworking holes as claimed in claim 9 wherein said spacer is made of a hard material, and is provided with a rough surface in the large diameter portion to complement said shoulder portion of said sleeve, a central circular passageway, and a small diameter portion being sufficiently tightly fitted into the inner ring of said bearing; the junction of the large diameter portion and the small diameter portion forming a step to seat on one face of the inner ring of said bearing.

18. The apparatus for coldworking holes as claimed in claim 9 wherein said rough surface in the large diameter portion of said spacer is a conical-shape inclined in a direction to complement said shoulder of said sleeve.

19. The apparatus for coldworking holes as claimed in claim 9 wherein said rough surface in the large diameter portion of said spacer is perpendicular to the axis of said spacer to complement said shoulder of said sleeve.

20. The apparatus for coldworking holes as claimed in claim 9 wherein said bearing is provided to seat said spacer and to ease the circular motion of said spacer while tightening said screw-threaded end-cap onto said screw-threaded adapter.

21. The apparatus for coldworking holes as claimed in claim 9 wherein said adapter is provided with a counter-bore to seat said bearing, a screw-threaded end to be fitted onto said end-cap, and another screw-threaded end to be fitted onto said extension tube.

22. The apparatus for coldworking holes as claimed in claim 9 wherein said extension-tube is provided to get access to the holes to be coldworked and is provided with a screw-threaded end to be assembled onto the cylinder of a mandrel pulling means, and another screwed-threaded end to be assembled onto said adapter.

* * * * *